United States Patent [19]
Lin

[11] Patent Number: 5,640,483
[45] Date of Patent: Jun. 17, 1997

[54] BACKLIGHTING SYSTEM UTILIZING TOTAL INTERNAL REFLECTION

[75] Inventor: Falcon Lin, HsinChu, Taiwan

[73] Assignee: CTX Opto-Electronics Corp., Hsinchu, Taiwan

[21] Appl. No.: 617,603

[22] Filed: Mar. 19, 1996

[51] Int. Cl.$^6$ .............................. G02B 6/10; G02F 1/1335
[52] U.S. Cl. .............................. 385/146; 385/14; 385/147; 385/36; 385/37; 349/62
[58] Field of Search .............................. 385/14, 49, 147, 385/146; 359/48, 49, 40, 42

[56] References Cited

U.S. PATENT DOCUMENTS

| | | | |
|---|---|---|---|
| 4,914,553 | 4/1990 | Hamada et al. | 359/49 X |
| 5,050,946 | 9/1991 | Hathaway et al. | 385/33 |
| 5,202,950 | 4/1993 | Arego et al. | 385/146 |
| 5,359,691 | 10/1994 | Tai et al. | 385/146 |
| 5,467,417 | 11/1995 | Nakamura et al. | 385/36 |
| 5,485,291 | 1/1996 | Qiao et al. | 359/49 |
| 5,485,354 | 1/1996 | Ciupke et al. | 359/49 X |

Primary Examiner—Brian Healy
Attorney, Agent, or Firm—Cushman Darby Cushman Intellectual Property Group of Pillsbury Madison & Sutro LLP

[57] ABSTRACT

A backlighting system for liquid crystal display (LCD) panels is disclosed to comprise at least a light source and a light pipe for receiving the light generated by the light source to provide the backlighting for the LCD panel. The light pipe consists of a flat front surface facing the LCD panel, a back surface facing the opposite direction to the LCD panel, and an end surface adjacent to the light source. The front surface extends toward the longitudinal direction away from the light source. The back surface consists of a plurality of parallel sections in parallel with the front surface, and connecting sections connecting adjacent parallel sections. The gap between the parallel section and the front surface decreases as the distance between the parallel section and the light source in the longitudinal direction increases. The system is characterized by the fact that the connecting sections on the back surface of the light pipe comprises at least two surfaces inclined to the parallel sections forming successive roof-shaped structures along the direction perpendicular to the longitudinal direction. This geometry increases the angle between the normal vector of the inclined surfaces and the incident vector of the incident light, thus reducing the portion of light editing the inclined surfaces out of the light pipe. The angle between two adjacent inclined surfaces is between 60 to 120 degrees.

7 Claims, 4 Drawing Sheets

BACKLIGHTING SYSTEM UTILIZING TOTAL INTERNAL REFLECTION

BACKGROUND OF THE INVENTION

1. Field of the Invention

The present invention relates in general to a backlighting system for liquid crystal display (LCD) panels. In particular, the present invention relates to a backlighting system for LCD panels having a structure utilizing total internal reflection to direct most of the light toward the viewing angle and to reduce energy loss, thereby increasing lighting efficiency of the system.

2. Technical Background

FIG. 1 shows a prior art backlighting system S1 for an LCD panel 1. This backlighting system includes a light source 5 providing light for the backlighting system; light pipe 3 consists of a flat front surface 9 and a flat back surface 10 in parallel with each other; one end surface 7 of the light pipe adjacent to the light source 5 receives light generated by the light source 5 to provide the backlighting for the LCD panel; the interior of the light pipe having light scattering material 8; reflective cover 6 surrounding light source 5 reflects light emitted by the light source 5 back to the light pipe 3; reflecting panel 4 reflects light exiting the light pipe through the back surface 10 back to the light pipe 3; and diffusing panel 2 between LCD panel 1 and light pipe 3 diffuses the incident light directed toward the LCD panel to provide a more uniform light source for the LCD panel and hides the dot pattern.

As shown in FIG. 1, light beam A is emitted by light source 5 and enters light pipe 3 via end surface 7. Light beam A normally travels in the longitudinal direction away from the light source 5 due to repetitive total internal reflection on the front surface 9 and back surface 10. When light beam A encounters a light scattering material 8, the condition for total internal reflection is destroyed, and its traveling path along the longitudinal direction is disrupted. A portion of the light will scatter toward the LCD panel 1 to provide the backlighting for the LCD panel. However, frequently the light beam is reflected and scattered many times before being directed toward the LCD panel 1. The more reflection and scattering the light beam experiences, the more energy loss it suffers. Thus, there are considerable drawbacks in the prior art design of this backlighting system S1 for the LCD panel.

To solve the problem of the prior art systems, a backlighting system S2, disclosed in U.S. Pat. No. 5,050,946, was designed to improve the performance of the LCD panel backlighting system S1 described above. FIGS. 2, 3, 4A and 4B together show the structure of this backlighting system S2. FIG. 2 is a partially cut-away perspective view of the backlighting system S2, FIG. 3 is an enlarged side view of the area identified by III in FIG. 2, FIG. 4A is an enlarged perspective view of the area proximate to the inclined surface N in FIG. 3, and FIG. 4B schematically shows the coordinate system used in the drawing.

Referring to both FIGS. 2 and 3 simultaneously, LCD panel backlighting system S2 also includes light source 5, reflective cover 6, light pipe 13, reflecting panel 14, and diffuser 2. The Z direction in FIG. 4B is the longitudinal direction of the light pipe 13, Y direction is the height direction of the light pipe 13, while the light tube of the light source 5 extends along the X direction, i.e., the direction perpendicular to both Y and Z directions.

It is clear from FIG. 2 and 3 that the only difference between the LCD panel backlighting system S1 and S2 is in the shape of the light pipe. In the backlighting system S2, the light pipe 13 also has a flat front surface 19, however, its back surface 20 includes a plurality of parallel sections G, E, and F, each in parallel with the front surface 19, as well as a plurality of connecting sections M, N, and so on for connecting the adjacent parallel sections. Each connecting section forms an inclined angle of approximately 135 degrees with respect to the parallel sections. The distance between the front surface 19 and the parallel sections G, E, and F decreases as the distance between the parallel sections to the end surface 17 along the longitudinal direction (the Z direction) increases (see FIG. 3).

It is also clear from FIGS. 2 and 3 that the light beam A, emitted by the light source 5 through end surface 17 into light pipe 13 with a larger incident angle with respect to the front surface 19, will experience many total internal reflections off the front surface 19 and the parallel sections G, E, F of the back surface 20, and will travel away from the light source 5. However, if light beam B, with a smaller incident angle with respect to the front surface 19, encounters one of the inclined connecting sections M or N, total internal reflection occurs, and the reflected beam B' most likely will meet the front surface 19 with an incident angle smaller than the critical angle for total internal reflection, thus exiting the light pipe from the front surface 19 and providing backlighting for fire LCD panel 1. Thus, the design of the LCD panel backlighting system S2 decreases the light path of some of the light beams traveling inside the light pipe 13, allowing those light beams to exit the light pipe from the front surface 19 after being reflected off the inclined connecting sections, thereby reducing the energy loss due to multiple reflection and scattering inside the light pipe 13.

Although this LCD panel backlighting system S2 does improve some of the drawbacks of the backlighting system S1, nevertheless, when a light beam C meets on the connecting section N at a substantially vertical angle, most of the energy of this light beam will exit the light pipe from the connecting section. Even though the reflecting panel 14 reflects most of the light back into the light pipe, the reflection coefficient is not 100%. Also, the direction of the reflected beam becomes half solid angle random reflection, that is lambertion reflection, and a large portion of energy in these light beams will be lost in the process of multiple reflection and scattering.

SUMMARY OF THE INVENTION

It is therefore the primary object of the present invention to further eliminate the aforementioned drawbacks of the LCD panel backlighting system S2, reducing the probability of light leaking through the connecting sections of the back surface of the light pipe, thereby increasing the efficiency of the LCD panel backlighting system.

In order to achieve the aforementioned object, an LCD panel backlighting system in accordance with the present invention includes at least a light source and a light pipe for receiving the light generated by the light source to provide the backlighting for the LCD panel. The light pipe consists of a flat front surface facing the LCD panel, a back surface facing the opposite direction to the LCD panel, and an end surface adjacent to the light source. The front surface extends toward the longitudinal direction away from the light source. The back surface consists of a plurality of parallel sections in parallel with the front surface, and connecting sections connecting adjacent parallel sections. The gap between the parallel section and the front surface decreases as the distance between the parallel section and the light source in the longitudinal direction increases. The system is characterized by the fact that the connecting sections on the back surface of the light pipe comprises at least two surfaces inclined toward the parallel sections forming successive roof-shaped structures along the direction perpendicular to the longitudinal direction. This geometry increases the angle between the normal vector of the inclined surfaces and the incident vector of the incident light, thus reducing the portion of light exiting from the inclined surfaces of the light pipe. The angle between two adjacent inclined surfaces is between 60 to 120 degrees.

In the aforementioned backlighting system for the LCD panel, the front surface of the light pipe may further comprise a plurality of parallel triangular prism columns to collimate light exiting from the front surface of the light pipe and direct it toward the LCD panel into a smaller viewing angle.

In the aforementioned backlighting system for the LCD panel, the end surface comprises a collimating section with decreasing cross-sectional area toward the light source.

In the aforementioned backlighting system for the LCD panel, a collimating means comprises a first flat surface facing the light source and a second surface facing the end surface of the light pipe, the second surface is a structured surface in parallel with the end surface of the light pipe and consists of a plurality of parallel triangular prism columns.

BRIEF DESCRIPTION OF THE DRAWING

The detailed structure, features and characteristics of the present invention will be described more clearly with the descriptions of the preferred embodiments in conjunction with the accompanying drawings, in which.

DETAILED DESCRIPTION OF THE PREFERRED EMBODIMENT

Figure 1:
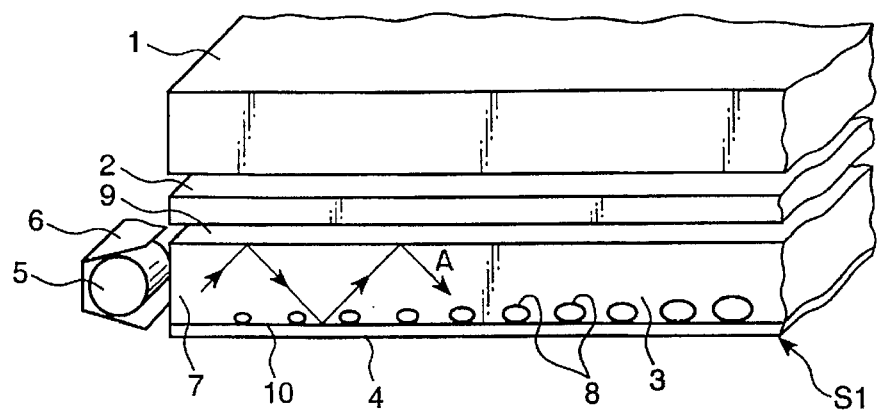
FIG. 1 is a perspective view of a portion of a prior art LCD panel backlighting system S1.
Figure 2:
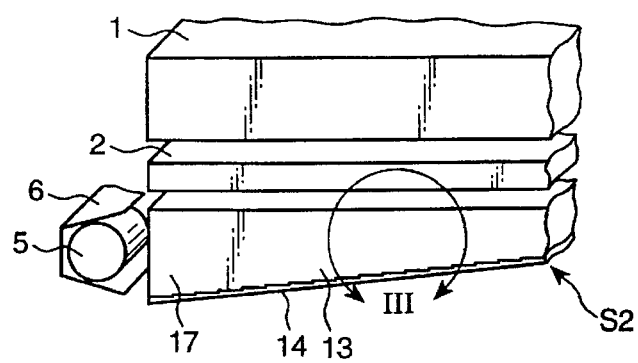
FIG. 2 is a perspective view of a portion of another prior art LCD panel backlighting system S2.
Figure 3:
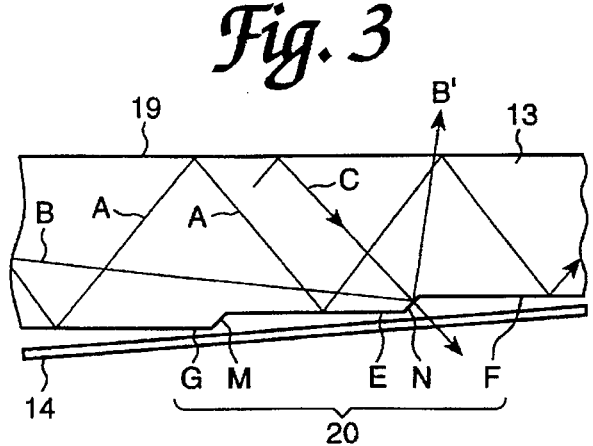
FIG. 3 is an enlarged side view of the portion labeled by III of the light pipe in FIG. 2, and the light beams traveling and reflecting within the light pipe.
Figure 4A:
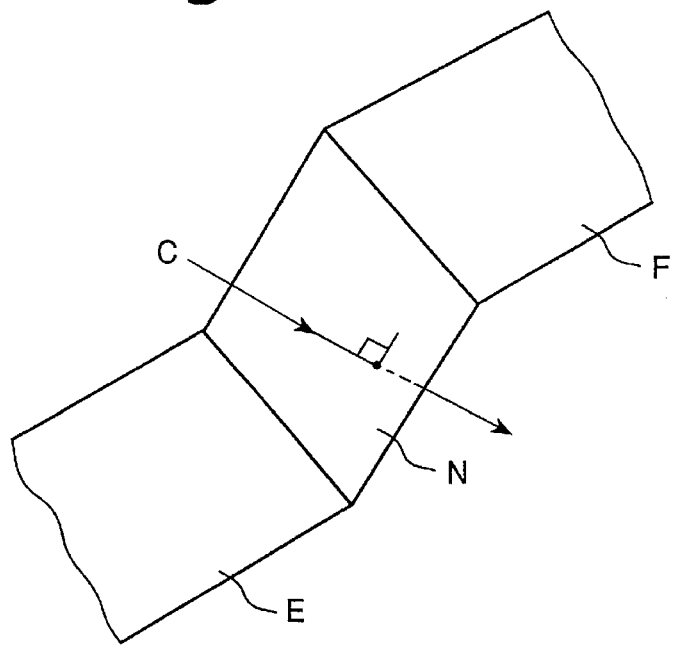
FIG. 4A is an enlarged perspective view of the back surface of the light pipe in FIG. 3.
Figure 5:
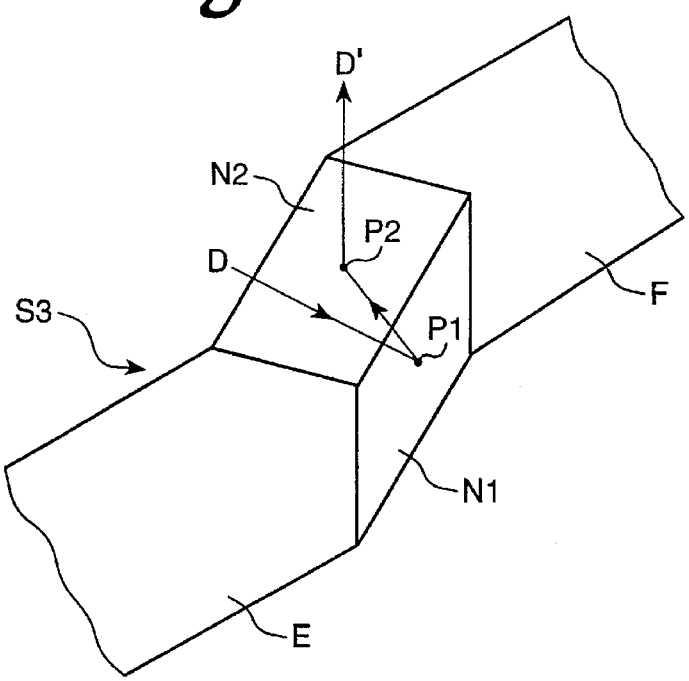
FIG. 5 shows a perspective view of the portion in FIG. 4A of a preferred embodiment S3 of an LCD panel backlighting system in accordance with the present invention.

FIG. 5 shows a perspective view of a portion of a preferred embodiment of an LCD panel backlighting system S3 in accordance with the present invention. This is equivalent to the portion of the a prior art LCD panel backlighting system S2 shown in FIG. 4A, i.e., the structure of the connecting section connecting the two adjacent parallel sections E and F. The connecting section N originally consisting of a single inclined surface in FIG. 4A is replaced by two inclined surface N1 and N2 in FIG. 5, forming an approximately 90-degree angle therebetween, and respectively inclined toward the parallel sections E and F. These two inclined surfaces N1 and N2 together form a roof-shaped structure.

FIG. 4A and FIG. 5 illustrate the effects of the changes in the structure of the connecting section. Referring to FIG. 4A, the light beam C, originally meets on the inclined surface N with a perpendicular or nearly perpendicular angle and exits the light pipe through the back surface, resulting in energy loss. However, in FIG. 5, due to the increased incident angle between the light beam D and the normal of the inclined surface N1, the probability of total internal reflection for light beam D at point P1 on the inclined surface N1 increases. Furthermore, the beam reflected off the inclined surface N1 will be reflected off the inclined surface N2 with total internal reflection, and finally exit from the front surface (not shown) to provide backlighting for the LCD panel. Thus, the energy loss in the prior art LCD panel backlighting system S2 shown in FIG. 4A can be greatly eliminated.

Figure 6:
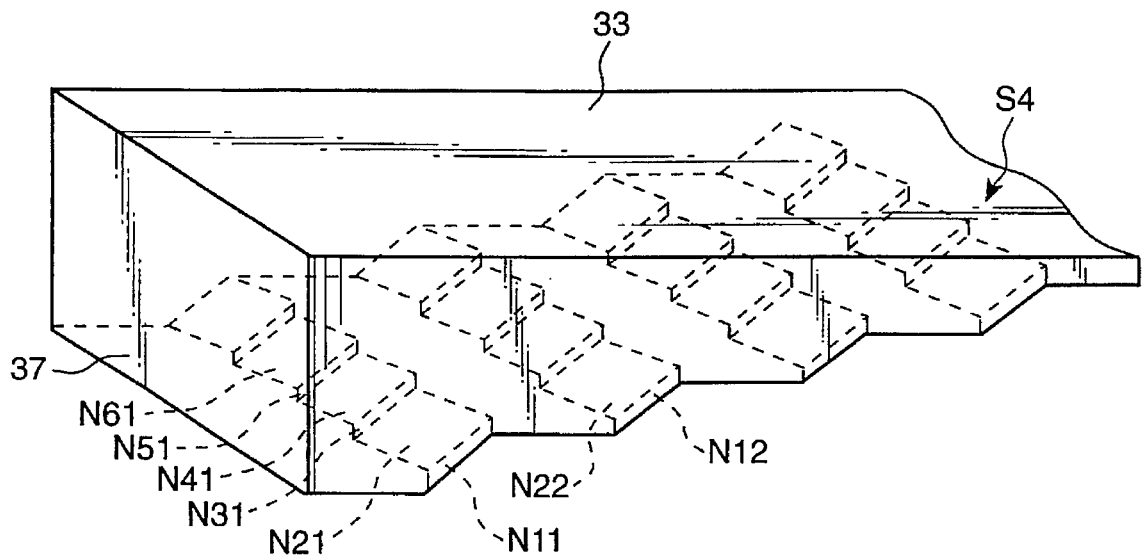
FIG. 6 shows a perspective view of another preferred embodiment of the light pipe of an LCD panel backlighting system S4 in accordance with the present invention.

FIG. 6 shows a perspective view of another preferred embodiment of the light pipe of an LCD panel backlighting system S4 in accordance with the present invention. The back surface of this preferred embodiment of the light pipe 33 is formed by improving the structure of the connecting section consisting of the two inclined surfaces N1 and N2 that connect the adjacent parallel sections shown in FIG. 5. Taking the first connecting section that is closest to the end surface 37 of the light pipe as an example, replace the two inclined surfaces N1 and N2 shown in FIG. 5 with a series of inclined surfaces N11, N21, N31, N41, N51, and N61. The adjacent inclined surfaces intersect each other with an angle approximately 90 degrees. The second connecting section is formed by a series of inclined surfaces N12, N22, etc.. The remainder of the connecting sections are constructed in a similar maimer as shown in FIG. 6.

Figure 7:
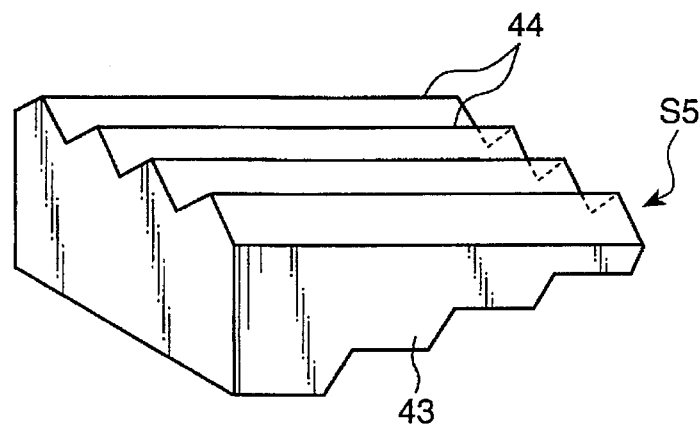
FIG. 7 shows a perspective view of still another preferred embodiment of the light pipe of an LCD panel backlighting system S5 in accordance with the present invention.

FIG. 7 shows a perspective view of a third preferred embodiment of the light pipe of an LCD panel backlighting system S5 in accordance with the present invention. Most of the structures of this light pipe 43, in particular the back surface, are identical to the light pipe shown in FIGS. 5 and 6. However, the front surface of this light pipe comprises a plurality of molded triangular prism columns 44 arranged parallel to the LCD panel (not shown in FIG. 7) to collimate light exiting the front surface 44 of the light pipe into a smaller viewing angle. Each of these prism columns 44 are also parallel to each other. The design of the parallel prism columns 44 and their collimating effects are well known in the art (for example, it was disclosed in U.S. Pat. No. 4,791,540), and will not be described in detail here.

Figure 8:
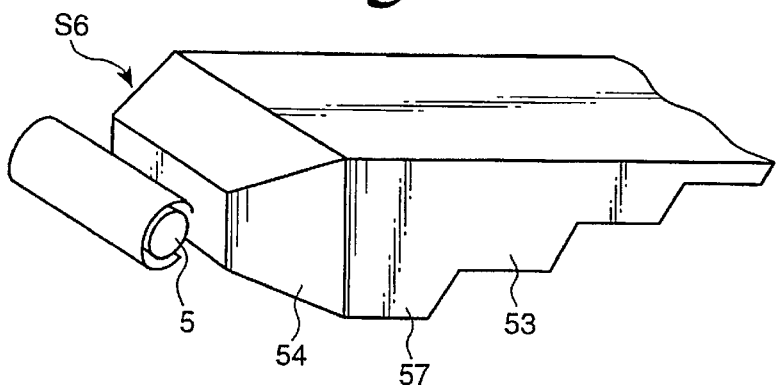
FIG. 8 shows a perspective view of yet another preferred embodiment of the light pipe and the light source of an LCD panel backlighting system S6 in accordance with the present invention.

FIG. 8 is a perspective view of a forth preferred embodiment of the light pipe 53 and light source 5 of an LCD panel backlighting system S6 in accordance with the present invention. Most of the structures of this light pipe 53, in particular the back surface, are identical to the light pipe shown in FIG. 5 and 6. The end surface 57 of the light pipe 53 adjacent to the light source 5 consists of a molded collimating section extending in the direction toward light source 5. The cross-sectional area in the Z direction (refer to FIG. 4B) of the collimating section 54 decreases with decreasing distance to the light source 5. Collimating section 54 collimates the light from the light source before it is injected into the light pipe 53. Also, it enhances the collimation of the light beams exiting the front surface of the light pipe 53 in the Z direction. The design of the collimating section 54, which is only the implement of optical invariant theory, is well know in the art, and will not be described in detail here.

Figure 4B:
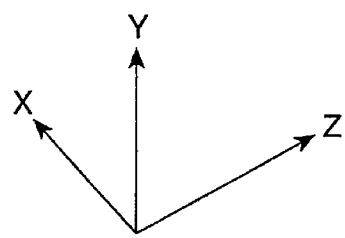
FIG. 4B shows the coordinates system utilized to illustrate the structures on the back surface of the light pipe.
Figure 9:
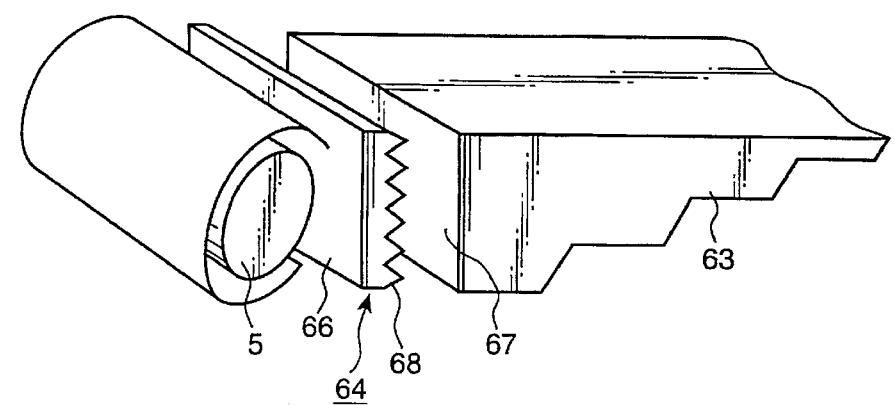
FIG. 9 shows a perspective view of yet another preferred embodiment of the light pipe, light source and collimating section of an LCD panel backlighting system S7 in accordance with the present invention.
Figure 10:
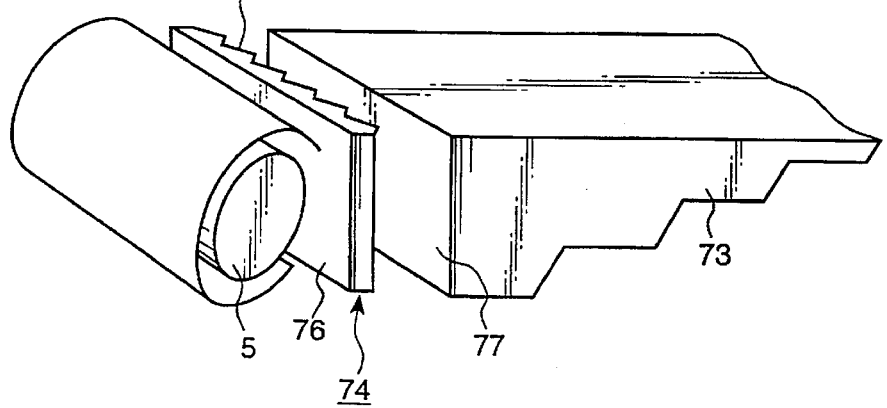
FIG. 10 show a perspective view of yet another preferred embodiment of the light pipe, light source and collimating means of an LCD panel backlighting system S8 in accordance with the present invention.

FIGS. 9 and 10 respectively show the perspective view of another two preferred embodiments of the light pipe and light source of the LCD panel backlighting system S7 and S8 in accordance with the present invention, respectively. First, refer to the backlighting system S7 of FIG. 9. The structures of the light pipe 63 of this backlighting system S7, in particular, the structures of the back surface (not shown in the drawing) are mostly identical to the backlighting system shown in FIG. 5 and 6. An additional collimating means 64 is located between the end surface 67 of the light pipe 63 and the light source 5. The collimating means 64 has a first flat surface 66 facing the light source 5, and a second surface 68 facing the end surface 67 of the light pipe 63. The second surface 68 consists of a plurality of molded triangular prism columns parallel to the end surface 67 of the light pipe 63. The prism columns, also parallel to each other and extending along the X direction (referring to FIG. 4B), collimate the light entering the light pipe 63 on the Y-Z plane. Refer to the backlighting system S8 shown in FIG. 10, the structure of this backlighting system S8 is mostly identical to the backlighting system shown in FIG. 9. There is a collimating means 74 arranged between the end surface 77 of the light pipe 73 and the light source 5. The collimating means 74 has a first flat surface 76 facing the light source 5, and a second surface 78 facing the end surface 77 of the light pipe 73. The second surface 78 comprises of a plurality of prism columns parallel to the end surface 77. Each of the parallel prism columns are parallel to each other, and extends along the Y direction (FIG. 4B). These prism columns collimate light on the Y-Z pirate before entering the light pipe 73. The design of the collimating means 64, and 74 are well known in the art, and will not be described in detail here.

The above description of the preferred embodiments of the present invention is intended to be utilized as an illustration of the concept of the present invention. The scope of the present invention is by no means limited by these embodiments. It is clear that various variations can be made to the system within the spirit and scope of the present invention. For example, in the previous preferred embodiment, the angle between the two inclined surface of the connecting section was exemplified to be approximately 90 degrees, nevertheless, it was found that the same effect can be achieved if the angle between the two inclined surfaces is between 60 to 120 degrees. The scope of the present invention shall be defined in the following claims.

What is claimed is:

1. A backlighting system utilizing total internal reflection comprising:
   at least one light source for providing backlighting for an LCD panel; and
   a light pipe receiving light generated by said at least one light source, and providing said backlighting for said LCD panel, said light pipe comprising:
   a flat front surface facing said LCD panel and extending along a longitudinal direction leading away from said light source,
   an end surface adjacent to said light source, and
   a back surface facing a direction opposite to a direction toward said LCD panel, said back surface including a plurality of parallel sections parallel to said front surface, and a connecting section connecting each two adjacent parallel sections of said plurality of parallel sections, a distance between said plurality of parallel sections and said front surface decreases with an increasing distance between said plurality of parallel sections and said end surface along said longitudinal direction,
   wherein said connecting section comprises at least two inclined surfaces, each of said at least two inclined surfaces inclined toward one of said plurality of parallel sections forming successive roof-shaped structures along a direction perpendicular to said longitudinal direction, thereby increasing an angle between a normal vector of said at least two inclined surfaces and an incident vector of an incident light, so as to reduce a portion of said light exiting said light pipe, an angle between two adjacent ones of said at least two inclined surfaces is between 60 to 120 degrees.

2. A backlighting system utilizing total internal reflection comprising:
   at least one light source for providing backlighting for an LCD panel; and
   a light pipe receiving light generated by said at least one light source, and providing said backlighting for said LCD panel, said light pipe comprising:
   a front surface facing said LCD panel and extending along a longitudinal direction leading away from said light source, said front surface of said light pipe including a plurality of molded triangular prisms in parallel with said LCD panel, and further parallel to each other, thereby collimating said light exiting said front surface of said light pipe and directing said light toward said LCD panel into a smaller viewing angle,
   an end surface adjacent to said light source, and
   a back surface facing a direction opposite to a direction toward said LCD panel, said back surface including a plurality of parallel sections parallel to said front surface, and a connecting section connecting each two adjacent parallel sections of said plurality of parallel sections, a distance between said plurality of parallel sections and said front surface decreases with an increasing distance between said plurality of parallel sections and said end surface along said longitudinal direction,
   wherein said connecting section comprises at least two inclined surfaces, each of said at least two inclined surfaces inclined toward one of said plurality of parallel sections forming successive roof-shaped structures along a direction perpendicular to said longitudinal direction, thereby increasing an angle between a normal vector of said at least two inclined surfaces and an incident vector of an incident light, so as to reduce a portion of said light exiting said light pipe, an angle between two adjacent ones of said at least two inclined surfaces is between 60 to 120 degrees.

3. The backlighting system of claim 1, wherein said end surface of said light pipe comprises a molded collimating section extending toward said light source, and the cross-sectional area of said collimating section decreases as a distance to said light source decreases.

4. The backlighting system of claim 1, wherein a collimating means is arranged between said end surface of said light pipe and said light source, said collimating means including a first flat surface facing toward said light source, and a structured second surface facing toward said end surface structured, said structured second surface comprising a plurality of triangular prism columns parallel to said end surface and to each other.

5. A backlighting system utilizing total internal reflection comprising:
- a light source for providing backlighting for an LCD panel; and
- a light pipe receiving light generated by said light source, and providing said backlighting for said LCD panel, said light pipe comprising:
  - a flat front surface facing said LCD panel and extending along a longitudinal direction leading away from said light source,
  - an end surface adjacent to said light source, and
  - a back surface facing a direction opposite to a direction toward said LCD panel, said back surface including a plurality of parallel sections parallel to said front surface, and a connecting section connecting each two adjacent parallel sections of said plurality of parallel sections, a distance between said plurality of parallel sections and said front surface decreases with an increasing distance between said plurality of parallel sections and said end surface along said longitudinal direction,
  - wherein said connecting section comprises two inclined surfaces, each of said two inclined surfaces inclined toward an adjacent parallel section of said plurality of parallel sections forming a roof-shaped structure, thereby increasing an angle between a normal vector of said two inclined surfaces and an incident vector of an incident light, so as to reduce a portion of said light exiting said light pipe, an angle between said two inclined surfaces is between 60 to 120 degrees.

6. The backlighting system of claim 4, wherein said plurality of triangular prism columns are extending along a direction parallel to a longitudinal direction of said end surface.

7. The backlighting system of claim 4, wherein said plurality of triangular prism columns are extending along a direction perpendicular to a longitudinal direction of said end surface.

* * * * *